United States Patent Office 2,855,156
Patented Oct. 7, 1958

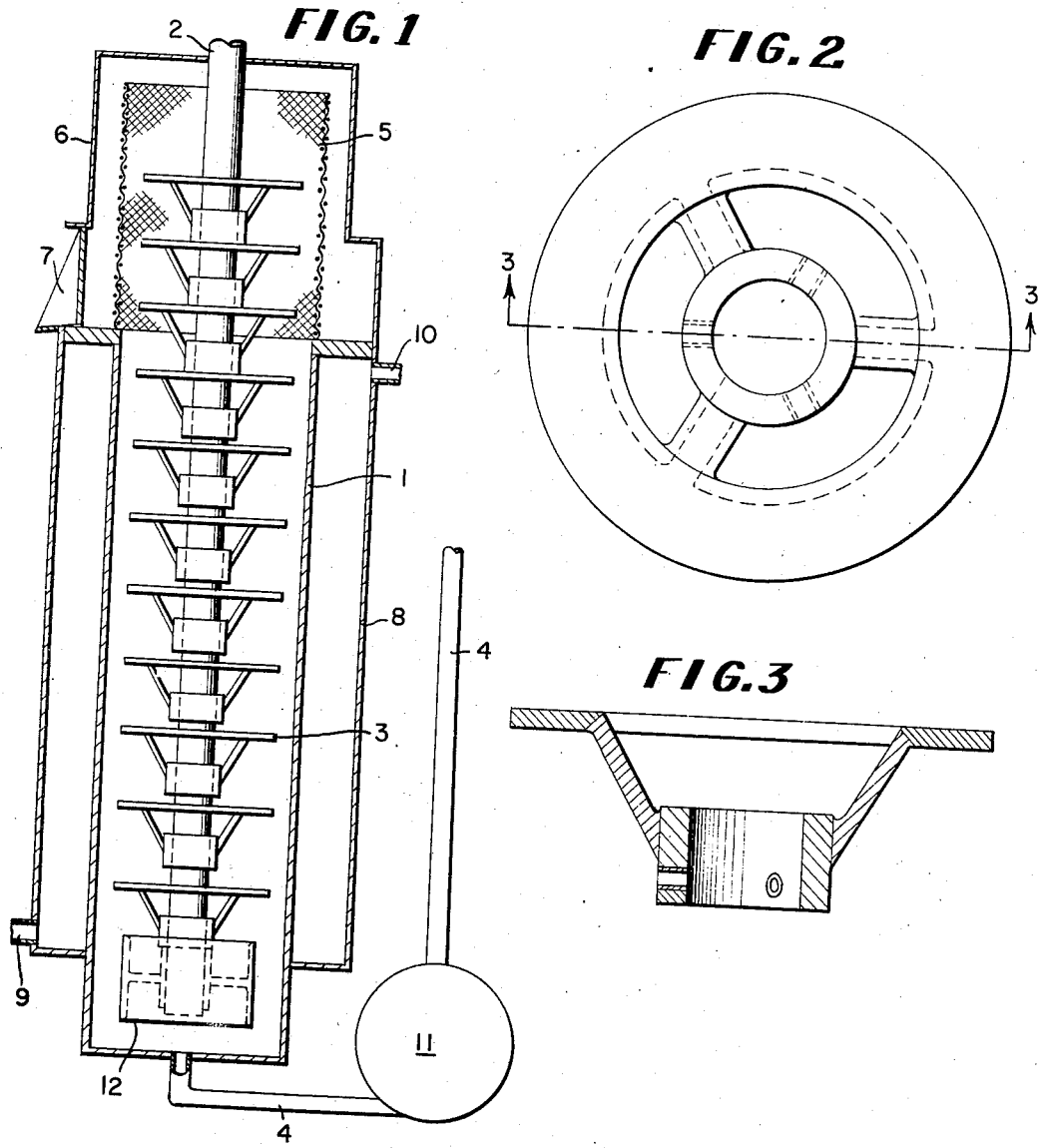

2,855,156

PROCESS OF AND APPARATUS FOR DISPERSING PIGMENTS IN FILM-FORMING MATERIALS BY AGITATION WITH SAND

Seymore Hochberg, Wynnewood, and David Gray Bosse, Haverford Township, Delaware County, Pa., assignors to E. I. du Pont de Nemours and Company, Wilmington, Del., a corporation of Delaware Application April 5, 1956, Serial No. 576,392

3 Claims. (Cl. 241—22)

This invention relates to a new and improved process of dispersing pigments in liquid media and/or reducing the particle size of pigments and apparatus suitable therefor.

In United States Patent No. 2,581,414, there is described a process for dispersing pigment in which the pigment to be dispersed is agitated, in a suitable apparatus, with 20-40 mesh sand and the film-forming material in which the pigment is to be dispersed. The film-forming material containing the dispersed pigment is thereafter separated from the sand. A suitable apparatus for carrying out this process is described in that patent.

It has now been discovered that an improved process resulting in vastly improved production rates can be obtained by introducing a slurry of the pigment and film-forming material into the bottom of a vertical hollow cylindrical vessel containing 20-40 mesh sand and subjecting the slurry and sand to agitation by means of a rotating shaft extending downwardly into said vessel generally along the cylindrical axis thereof and having a plurality of spoked annular ring impellers attached thereto. These impellers have an outer diameter intermediate between the diameter of the shaft and the inner diameter of the vessel. The film-forming material containing the thoroughly dispersed pigment is then passed through a screen at the top of the vessel and collected.

While it has been found that sand of any type will function in the process of Patent No. 2,581,414, it is preferred to use Ottawa type sand.

The term "Ottawa sand" is applied to sand found in the vicinity of Ottawa, Illinois, United States of America, and is referred to in ASTM specification C-190 as a standard testing sand for testing concrete. It is sold under that designation as a regular article of commerce. It is characterized by having a high (99% or more) silica content, substantially all of the particles are individual crystals or parts thereof, practically no conglomerates or groups of crystals cemented by foreign materials are present, and the individual particles have rounded edges.

Sand is commonly sold by size designation, such as "20-30 mesh." This means that the sand particles are small enough to pass through a No. 20 sieve but large enough not to pass through a No. 30 sieve. ASTM specification E-11 for sieves gives the following relations between sieve numbers and sieve openings:

| Sieve No.: | Sieve opening, mm. |
|---|---|
| 4 | 4.76 |
| 10 | 2.00 |
| 12 | 1.68 |
| 16 | 1.19 |
| 20 | 0.84 |
| 30 | 0.59 |
| 40 | 0.42 |
| 50 | 0.297 |
| 60 | 0.250 |
| 70 | 0.210 |
| 80 | 0.177 |
| 100 | 0.149 |
| 120 | 0.125 |
| 140 | 0.105 |
| 170 | 0.088 |

In order to more clearly describe this present invention, reference is made to the accompanying drawings which illustrates embodiments of apparatus suitable for carrying out the invention, in which:

Fig. 1 is a vertical sectional view of the apparatus for continuous operation fed from the bottom and having the discharge screen at the top.

Figs. 2 and 3 show details of the spoked annular ring impellers used in the apparatus of Fig. 1, Fig. 3 being a vertical section through Fig. 2 on the line 3—3.

Referring to Fig. 1, the apparatus comprises a vertical hollow cylindrical vessel 1, having a motor driven agitator shaft 2 extending downwardly therein along the cylindrical axis thereof, and an inlet pipe 4 at its bottom end. Shaft 2 is provided with a plurality of spoked annular ring impellers 3. The impellers 3 have an outer diameter intermediate between the diameter of shaft 2 and the inner diameter of vessel 1.

The top of vessel 1 is covered by a mesh screen 5. A circumferential jacket 6 encloses the top of vessel 1, and is equipped with outlet 7, shown here as a downwardly slanting trough, for discharging the processed material. The main purposes of this jacket are to keep the outer surface of the screen wet, to take the inside pressure of the liquid head in vessel 1 off the screen by the liquid in the jacket resisting that pressure, and to establish a reservoir so that a uniform discharge rate can be maintained. The lower portion of vessel 1 is provided with a circumferential jacket 8 equipped with inlet and outlet openings 9 and 10, respectively, for a temperature controlling fluid, such as water or steam (not shown).

The screen 5 is mounted over the open top of vessel 1 by any means which avoids leakage around the edges. The mesh size of the screen must be such that the dispersion will flow freely therethrough during normal operation, without allowing the sand to pass through. For example, in enamel mill base production using 20-30 mesh sand (0.84-0.59 mm.), a standard 80 x 80 mesh screen having 0.177 mm. openings is suitable.

It should be understood that the drawing illustrates simple examples of the many embodiments useful in the broad aspects of this invention, and therefore illustrates only the basic elements involved. For instance, the impellers 3 may be mounted on- or off-center and at any desired angle to the shaft 2, but are here shown on-center.

The actual dimensions are not critical, but the drawings are approximately to scale for an apparatus that could be used in making an enamel mill base.

The materials of construction are preferably steel, although the equipment may be surfaced with rubber or the like, and the impellers may be of hardened steel, glass, nylon, "Teflon" tetrafluoroethylene resin, or other suitable material.

In using the equipment shown in Fig. 1, to make an enamel mill base, the pigment and vehicle are premixed into a slurry in the proper proportions. The proper ratio of sand to slurry by volume having previously been determined (30%-65% sand to 70%-35% slurry, by volume), and the proper amount of sand and other components having been charged into the grinding vessel, this ratio is maintained by controlling the input rate of dispersing medium and material to be dispersed so that it equals the output rate of completely dispersed material.

The slurry of the ingredients is introduced below the impellers through inlet pipe 4 (shown here entering through the bottom) from a reservoir (not shown). The slurry is moved by gravity, or preferably by a metering pump 11, at sufficient pressure so that the level within the apparatus is maintained near the top of screen 5. The dispersed material, having passed up through the grinding zone and out through the screen is discharged through outlet 7.

While the ingredients are being charged into vessel 1, the impellers 3 are revolving at the desired speed. The sand particles, which are moving relatively fast and are distributed uniformly throughout the mixture, disperse the pigment in the vehicle, break up agglomerates, and produce a smooth uniform dispersion which flows through screen 5, while the latter retains the sand. Upon filling the jacket 6, the dispersed material flows from opening 7 at a rate controlled by any suitable means (not shown). If the process requires heating or cooling, a suitable heat exchanging fluid may be circulated through jacket 8 via connections 9 and 10.

When a large number of impellers is used as shown in Fig. 1 or the shaft is long for other reasons, the bottom end of the shaft can be stabilized against radial vibration or bending by attaching a flat belt pulley wheel 12. Alternatively, the lower end of the shaft can be extended to a bearing structure (not shown) fixed in or near the bottom of the vessel, under which conditions the inlet pipe 4 can enter the vessel at a point displaced from said bearing.

The bottom-feed continuous process apparatus of Fig. 1 is particularly adapted to production rates of the order of three to five times that of a top-feed continuous process 2- or 3-impeller apparatus illustrated in Patent No. 2,581,414 when the two types of apparatus being compared have substantially equal volume capacities and are used to process the same slurry.

The following example is illustrative of the invention:

EXAMPLE I

*Alkyd resin enamel mill base*

|  | Grams |
|---|---|
| 52.7% linseed oil modified glycerol phthalate resin | 15.1 |
| Soya lecithin (50% solution) | 1.5 |
| Hydrocarbon solvent | 17.5 |
| Phenolic inhibitor (1% solution) | 2.8 |
| Titanium dioxide pigment | 63.1 |
|  | 100.0 |

A slurry of the above composition was prepared in a mixer adjacent to the continuous apparatus shown in Fig. 1, in which the impellers were as shown in Figs. 2 and 3, and which had been charged with dry 20-30 mesh Ottawa sand to a point just below where the screen joins the top of the cylindrical vessel. The screen was a 100 x 100 mesh wire screen.

A portion of the slurry was poured over the sand in the vessel and was permitted to trickle down through the sand until the voids had been filled and the slurry was at substantially the same level as the sand, resulting in a volume ratio of sand to total mixture (sand and slurry) of approximately 50%.

Then, pumping of the slurry from the adjacent mixture into the bottom of the grinding vessel was started and the motor driving the impeller shaft was started.

The level of the whole mixture rose to near the top of the screen and the ground slurry began to flow through the screen and into a collecting vessel at the outlet. Shortly thereafter, the fineness of the dispersion flowing from the outlet was 0.002 inch, at which time, the first collecting vessel was replaced with a product collecting vessel. The small amount of partially processed material previously collected was returned to the adjacent mixer for full processing. At this point, the process was operating continuously, and as the supply of crude slurry in the mixer was nearly exhausted, an additional supply was made so that the continuous operation of the grinding apparatus would not be interrupted.

The rate at which ground mill base was produced was approximately four times the rate obtained with the apparatus described in Patent No. 2,581,414 of substantially the same size.

The ground mill base thus produced was used in making a high gloss enamel by the addition of metallic dryer and further resin and solvent.

If a finer grind is required in any particular case, it may be obtained as follows:

(1) The efflux may be recirculated through the same or duplicate equipment;
(2) The discharge screen areas may be restricted; or
(3) The feed and output rates may be decreased.

The volume capacity of the apparatus can vary from small vessels to large vessels containing of the order of 30 gallons. Even larger vessels can be used where the structural and power requirements can be satisfied.

The operation of this invention is not restricted to the dispersed pigment or the dispersion medium set forth in the foregoing example. For instance, all pigments commonly used in coating compositions will respond to grinding or dispersion by this process. Such pigments include whites and colors, organic and inorganic, natural and synthetic, and extenders. Any film-forming material in reasonably fluid form (relatively low viscosity) will serve as the dispersion medium for selected pigments. Such film-formers include raw and treated oils (drying, semi-drying, and non-drying), oleo-resinous varnishes, natural and synthetic resins, oil-modified resins, cellulosic materials, emulsions of these substances, and plasticizers.

While 20-40 mesh Ottawa sand is the preferred grade of sand to use in the practice of this invention, as discussed above, the use of any sand within that range and of any origin, will produce satisfactory dispersions. In the case of high quality enamels, of course, the sand used should be free of all friable impurities, and it is for this reason that Ottawa sand, or its equivalent, is preferred. In other words, when a given size range, such as 20-40 mesh, is referred to herein, it means that the sand remains within about this size classification throughout the grinding operation.

For most of the purposes of this invention, glass and some plastic beads, in the corresponding sizes, are the equivalents of sand, since they are not only hard and relatively non-friable, but are inert from the standpoint of affecting the color of the materials being dispersed. When plastic beads are used, they should of course be non-softening at the temperatures encountered in the dispersing operation.

The volume ratio of sand to the total mixture (sand, liquid, and solid to be dispersed) is important for the efficient operation of this invention. Too low a sand concentration involves long agitation or grinding periods. Too high a concentration obviously wastes space in the apparatus, decreases the fluidity of the mixture, and generally limits efficiency. The preferred concentration is 45% to 60% by volume of sand, although 30% to 65% by volume is efficiently operable.

Determination of the viscosity of the starting mixtures is difficult because they are heterogeneous (not smooth, but lumpy), but the final products are smooth and their viscosity may be determined by standard methods. The preferred conditions yield products having a viscosity of 1-250 poises as they emerge from the outlet.

It is apparent that many widely different embodiments of this invention can be made without departing from the spirit and scope thereof and, therefore, it is not intended to be limited except as indicated in the appended claims.

We claim:

1. An apparatus for deagglomerating and dispersing particulate solids in liquids which comprises a vertical cylindrical vessel having an inlet at or near the bottom and a screen at or near the top, a rotatable shaft extending downwardly in said vessel generally along the cylindrical axis thereof and within said vessel attached to said shaft in spaced relation to each other a plurality of spoked, flat, annular disc impellers.

2. An apparatus for deagglomerating and dispersing particulate solids in liquids which comprises a vertical cylindrical vessel having an inlet at or near the bottom and a screen at or near the top, a rotatable shaft extending downwardly in said vessel generally along the cylindrical axis thereof and within said vessel a plurality of like, flat, horizontally disposed, annular disc impellers substantially uniformly spaced with respect to each other and said shaft, each of which discs is attached to said shaft through a hub to which the disc is attached by spokes disposed at a uniform acute angle from the plane of the disc.

3. In a process in which pigment is deagglomerated and dispersed in a film-forming material by means of agitation with sand, the improvement which comprises continuously passing a slurry of film-forming material and pigment to be deagglomerated and dispersed into the bottom of a vertical columnar body consisting essentially of a uniform mixture of 20–40 mesh sand present in amount of 30–65% by volume of the mixture, pigment and film-forming material, continuously imparting a generally horizontal motion to the sand particles throughout said body, and at the top of said body continuously separating a dispersion of pigment in film-forming material from the sand with which it is mixed.

References Cited in the file of this patent

UNITED STATES PATENTS

| | | |
|---|---|---|
| 267,768 | Bailey et al. | Nov. 21, 1882 |
| 789,599 | Flatau | May 9, 1905 |
| 1,129,158 | Babek | Feb. 23, 1915 |
| 1,956,293 | Klein et al. | Apr. 24, 1934 |
| 2,239,952 | Dergance | Apr. 29, 1941 |
| 2,431,478 | Hill | Nov. 25, 1947 |
| 2,581,414 | Hochberg | Jan. 8, 1952 |
| 2,592,994 | Ahlmann | Apr. 15, 1952 |
| 2,769,623 | Cawood et al. | Nov. 6, 1956 |

UNITED STATES PATENT OFFICE
CERTIFICATE OF CORRECTION

Patent No. 2,855,156　　　　　　　　　　　　　　　　　October 7, 1958

Seymore Hochberg et al.

It is hereby certified that error appears in the printed specification of the above numbered patent requiring correction and that the said Letters Patent should read as corrected below.

Column 3, line 65, for "0.002" read -- 0.0002 --.

Signed and sealed this 23rd day of December 1958.

(SEAL)
Attest:
KARL H. AXLINE
Attesting Officer

ROBERT C. WATSON
Commissioner of Patents